US009894195B2

United States Patent
Yang

(10) Patent No.: US 9,894,195 B2
(45) Date of Patent: Feb. 13, 2018

(54) MOBILE TERMINAL AND METHOD FOR THE MOBILE TERMINAL TO AUTOMATICALLY ANSWER AN INCOMING CALL

(71) Applicant: Huizhou TCL Mobile Communication Co., Ltd, Huizhou, Guangdong (CN)

(72) Inventor: Yan Yang, Huizhou (CN)

(73) Assignee: HUIZHOU TCL MOBILE COMMUNICATION CO., LTD., Huizhou, Guangdong Province (CN)

(*) Notice: Subject to any disclaimer, the term of this patent is extended or adjusted under 35 U.S.C. 154(b) by 0 days.

(21) Appl. No.: 15/127,898

(22) PCT Filed: Apr. 1, 2016

(86) PCT No.: PCT/CN2016/078300
§ 371 (c)(1),
(2) Date: Sep. 21, 2016

(87) PCT Pub. No.: WO2017/005020
PCT Pub. Date: Jan. 12, 2017

(65) Prior Publication Data
US 2017/0180532 A1 Jun. 22, 2017

(30) Foreign Application Priority Data
Jul. 8, 2015 (CN) .......................... 2015 1 0401935

(51) Int. Cl.
*H04M 1/725* (2006.01)
*H04N 7/18* (2006.01)
(Continued)

(52) U.S. Cl.
CPC ............ *H04M 1/725* (2013.01); *G06F 3/044* (2013.01); *G06K 9/6202* (2013.01);
(Continued)

(58) Field of Classification Search
CPC ..... H04W 4/028; H04W 4/008; H04W 4/026; H04W 12/04; H04W 12/06; H04W 12/08; H04W 12/12
(Continued)

(56) References Cited

U.S. PATENT DOCUMENTS 9,049,983 B1 6/2015 Baldwin
9,413,875 B2 * 8/2016 Jang ...................... H04M 1/656
(Continued)

FOREIGN PATENT DOCUMENTS

CN 102055842 A 5/2011
CN 103220432 A 7/2013
(Continued)

OTHER PUBLICATIONS

International Search Report on corresponding PCT application (PCT/CN2016/078300) from International Searching Authority (CN) dated Jun. 21, 2016.

*Primary Examiner* — Jean Gelin
(74) *Attorney, Agent, or Firm* — Cheng-Ju Chiang

(57) ABSTRACT

A mobile terminal and a method for the mobile terminal to automatically answer an incoming call are disclosed. Firstly when there is an incoming call for the mobile terminal, whether an auricle image is acquired at a screen side of the mobile terminal is detected, and if the auricle image is acquired, then the auricle image is compared with image templates in an pre-stored auricle standard library to determine whether there is a matching image template, and if it is determined that there is a matching image template, then the mobile terminal is controlled to answer the incoming call.

20 Claims, 4 Drawing Sheets

(51) Int. Cl.
  *G06K 9/62* (2006.01)
  *G06F 3/044* (2006.01)
  *H04M 3/42* (2006.01)

(52) U.S. Cl.
  CPC ........ *H04M 3/42059* (2013.01); *H04N 7/185* (2013.01); *H04M 2250/12* (2013.01); *H04M 2250/22* (2013.01)

(58) Field of Classification Search
  USPC .................. 455/410, 411, 414.1, 41.1, 41.2
  See application file for complete search history.

(56) References Cited

U.S. PATENT DOCUMENTS

| | | | | |
|---|---|---|---|---|
| 2003/0194071 | A1* | 10/2003 | Ramian | H04M 15/00 379/114.19 |
| 2007/0165809 | A1* | 7/2007 | Nemoto | H04M 1/2535 379/142.06 |
| 2009/0060170 | A1* | 3/2009 | Coughlan | H04M 1/605 379/433.02 |
| 2009/0124286 | A1* | 5/2009 | Hellfalk | H04M 1/6058 455/556.1 |
| 2010/0075631 | A1* | 3/2010 | Black | H04M 1/05 455/410 |
| 2011/0103563 | A1 | 5/2011 | Dai et al. | |
| 2012/0164978 | A1* | 6/2012 | Conti | G06F 21/32 455/411 |
| 2012/0214542 | A1* | 8/2012 | Sarin | H04M 1/72519 455/550.1 |
| 2013/0095886 | A1 | 4/2013 | Hong et al. | |
| 2015/0148010 | A1* | 5/2015 | Nakazato | G06F 3/0412 455/411 |
| 2016/0006772 | A1* | 1/2016 | Shimizu | H04L 65/403 709/204 |
| 2017/0168566 | A1* | 6/2017 | Osterhout | G06F 3/014 |

FOREIGN PATENT DOCUMENTS

| | | |
|---|---|---|
| CN | 104580676 A | 4/2015 |
| CN | 105100461 A | 11/2015 |

* cited by examiner

MOBILE TERMINAL AND METHOD FOR THE MOBILE TERMINAL TO AUTOMATICALLY ANSWER AN INCOMING CALL

FIELD OF THE DISCLOSURE

The present disclosure relates to the technical field of mobile terminals, and more particularly, to a mobile terminal and a method for the mobile terminal to automatically answer an incoming call.

BACKGROUND OF THE DISCLOSURE

With rapid development of smart terminals, mobile terminals such as mobile phones and tablet computers become more and more powerful in terms of functions and the display screens thereof become increasingly larger. This makes it more and more difficult to operate a mobile terminal with a single hand, and most of the mobile terminals need to be operated with both hands. Especially when there is an incoming call for a large-screen mobile terminal, it is not easy to press a button or slide the screen with a single hand to answer the incoming call, and instead, usually this must be done with both hands. If the user happens to be in a busy state (e.g., one hand becomes dirty, an article is being held in one hand, or the user is driving a vehicle) at this moment, it will be very inconvenient to manually answer the incoming call and, also, there is a risk that the mobile terminal might be dropped inadvertently to become damaged.

Accordingly, the existing technology of manually answering an incoming call with a single hand or both hands cannot satisfy the need of answering the incoming call for a mobile terminal simply and conveniently.

SUMMARY OF THE DISCLOSURE

A primary technical problem to be solved by the present disclosure is to provide a mobile terminal and a method for the mobile terminal to automatically answer an incoming call, which allow for answering the incoming call simply and conveniently without the need of manually operating the mobile terminal.

To solve the aforesaid technical problem, a first technical solution adopted by the present disclosure is to provide a mobile terminal, which comprises a processor, a storage, a bus and a screen, wherein the processor, the storage and the screen are connected to the bus respectively, the storage is configured to store a program, and the processor is configured to execute the program;

the program is configured to:

monitor if there is any incoming call for the mobile terminal;

detect if action information of a user satisfies a preset triggering condition when an incoming call for the mobile terminal is monitored;

if the preset triggering condition is satisfied, then control the mobile terminal to acquire an image at the screen side and determine whether the image acquired is an auricle image;

if the image is an auricle image, then compare the auricle image with image templates in an pre-stored auricle standard library to determine whether there is a matching image template;

if it is determined that there is a matching image template, then further determine whether a time at which the auricle image is acquired is within a preset usable time period; and if it is determined that the time at which the auricle image is acquired is within the preset usable time period, then control the mobile terminal to answer the incoming call.

In one embodiment, the program presets that each of the image templates is associated with a plurality of telephone numbers, and the program is further configured to compare a telephone number of the incoming call with the plurality of telephone numbers associated with the matching image template, determine whether there is a matching telephone number, and if it is determined that there is a matching telephone number, then control the mobile terminal to answer the incoming call.

In one embodiment, the mobile terminal further comprises a capacitive touch screen or a distance sensor, and a camera;

the program is further configured to, when an incoming call for the mobile terminal is monitored, control the capacitive touch screen or the distance sensor of the mobile terminal to detect if there is any object approaching; and the program is further configured to, when there is an object approaching, control the capacitive touch screen or the camera to acquire an image of the object at the screen side and determine whether the image of the object is an auricle image.

To solve the aforesaid technical problem, a second technical solution adopted by the present disclosure is to provide a method for a mobile terminal to automatically answer an incoming call, the method comprises the following blocks: detecting if an auricle image is acquired at the screen side of the mobile terminal when there is an incoming call for the mobile terminal; if the auricle image is acquired, then comparing the auricle image with image templates in an pre-stored auricle standard library to determine whether there is a matching image template; if it is determined that there is a matching image template, then controlling the mobile terminal to answer the incoming call.

In one embodiment, the block of if it is determined that there is a matching image template, then controlling the mobile terminal to answer the incoming call further comprises: if it is determined that there is a matching image template, then further determining whether a time at which the auricle image is acquired is within a preset usable time period; and if it is determined that the time at which the auricle image is acquired is within the preset usable time period, then controlling the mobile terminal to answer the incoming call.

In one embodiment, each of the image templates is associated with a plurality of telephone numbers, and the block of if it is determined that there is a matching image template, then controlling the mobile terminal to answer the incoming call further comprises: comparing a telephone number of the incoming call with the plurality of telephone numbers associated with the matching image template to determine whether there is a matching telephone number; and if it is determined that there is a matching telephone number, then controlling the mobile terminal to answer the incoming call.

In one embodiment, the block of detecting if an auricle image is acquired at the screen side of the mobile terminal when there is an incoming call for the mobile terminal comprises: monitoring if there is any incoming call for the mobile terminal; detecting if action information of a user satisfies a preset triggering condition when there is an incoming call for the mobile terminal; if the preset triggering condition is satisfied, then controlling the mobile terminal to acquire an image at the screen side and determining whether the image acquired is an auricle image.

In one embodiment, the block of detecting if action information of a user satisfies a preset triggering condition when there is an incoming call for the mobile terminal comprises: using a capacitive touch screen or a distance sensor of the mobile terminal to detect if there is any object approaching; and the block of if the preset triggering condition is satisfied, then controlling the mobile terminal to acquire an image at the screen side and determining whether the image acquired is an auricle image comprises: if there is an object approaching, using the capacitive touch screen or a camera to acquire an image of the object at the screen side and determining whether the image of the object is an auricle image.

To solve the aforesaid technical problem, a third technical solution adopted by the present disclosure is to provide a mobile terminal, which comprises: an image detecting module, being configured to detect if an auricle image is acquired at the screen side of the mobile terminal when there is an incoming call for the mobile terminal; a storage module, being configured to pre-store an auricle standard library comprising auricle templates; a matching module, being configured to, if the auricle image is acquired, compare the auricle image with the image templates in the storage module to determine whether there is a matching image template; and a call controlling module, being configured to, if it is determined that there is a matching image template, then control the mobile terminal to answer the incoming call.

In one embodiment, when it is determined that there is a matching image template, the matching module is further configured to determine whether a time at which the auricle image is acquired is within a preset usable time period, and if it is determined that the time at which the auricle image is acquired is within the preset usable time period, the call controlling module controls the mobile terminal to answer the incoming call, wherein the usable time period is associated with the image templates and preset in the storage module.

In one embodiment, each of the image templates preset in the storage module is associated with a plurality of telephone numbers, and the matching module is further configured to compare a telephone number of the incoming call with the plurality of telephone numbers associated with the matching image template to determine whether there is a matching telephone number, and if it is determined that there is a matching telephone number, then the call controlling module controls the mobile terminal to answer the incoming call.

In one embodiment, the image detecting module further comprises a monitoring unit, a detecting unit and an acquiring and determining unit; the monitoring unit is configured to monitor if there is any incoming call for the mobile terminal; the detecting unit is configured to detect if action information of a user satisfies a preset triggering condition when there is an incoming call for the mobile terminal; the acquiring and determining unit is configured to, if the preset triggering condition is satisfied, control the mobile terminal to acquire an image at the screen side and determine whether the image acquired is an auricle image.

In one embodiment, the detecting unit is further configured to, if an incoming call for the mobile terminal is monitored, use a capacitive touch screen or a distance sensor of the mobile terminal to detect if there is any object approaching; the acquiring and determining unit is further configured to, if there is an object approaching, use the capacitive touch screen or a camera to acquire an image of the object at the screen side and determine whether the image of the object is an auricle image.

The present disclosure has the following benefits: firstly when there is an incoming call for the mobile terminal, whether an auricle image is acquired by the mobile terminal is detected, and if the auricle image is acquired, then the auricle image is compared with image templates in an pre-stored auricle standard library to determine whether there is a matching image template, and if it is determined that there is a matching image template, then the mobile terminal is controlled to answer the incoming call. As compared with the existing technology of manually operating the mobile terminal by using a single hand or both hands to press a button or slide the screen, the mobile terminal of the present disclosure compares the auricle image acquired with preset image templates, and if there is a matching image template, then the incoming call can be automatically answered. Thereby, the incoming call can be answered simply and conveniently without the need of manual operation, thus improving the user experiences.

DETAILED DESCRIPTION OF THE DISCLOSURE

To make the technical problems to be solved, the technical solutions and the benefits of the present disclosure clearer and more apparent, the present disclosure will be further detailed hereinbelow with reference to the attached drawings and embodiments thereof. It shall be understood that, the specific embodiments described herein are only used to explain but not to limit the present disclosure.

Figure 1:
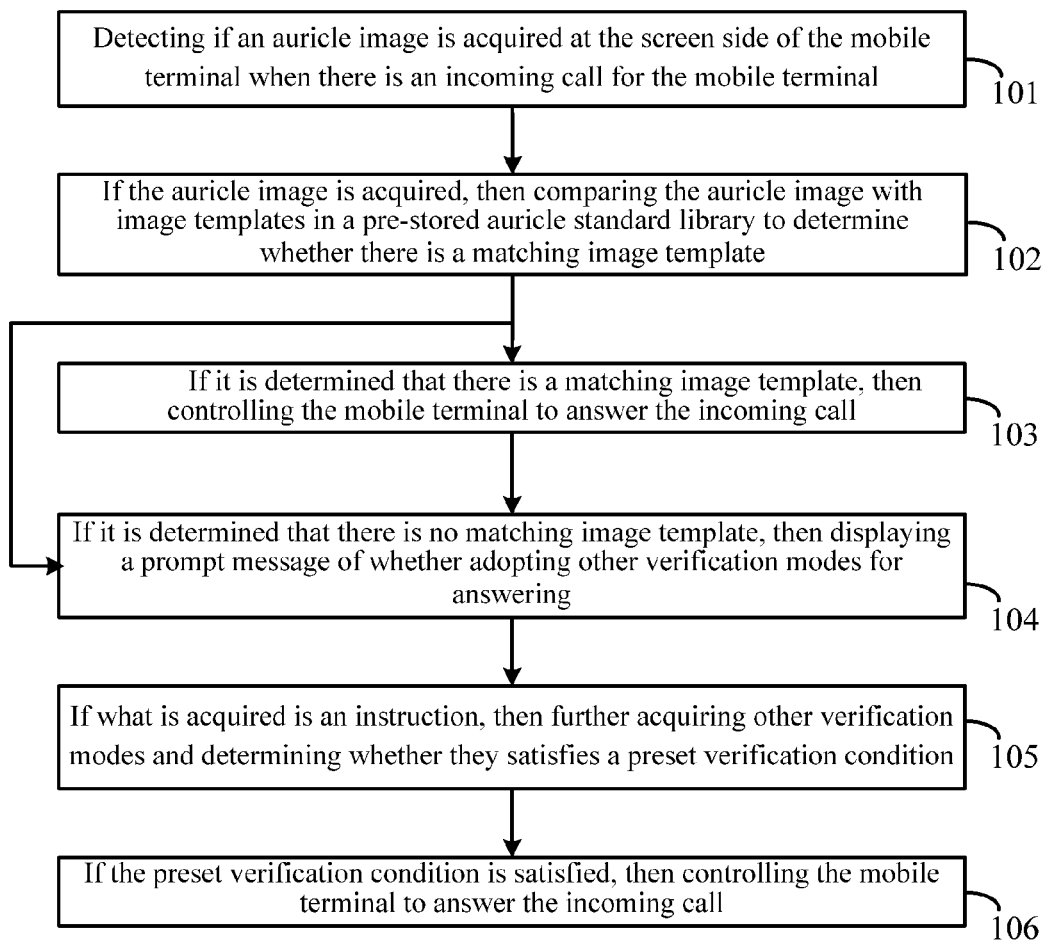
FIG. 1 is a schematic flowchart of a first embodiment of a method for automatically answering an incoming call according to the present disclosure.

Referring to FIG. 1, there is shown a schematic flowchart of a first embodiment of a method for automatically answering an incoming call according to the present disclosure. As shown in FIG. 1, the method may comprises the following blocks:

Block 101: detecting if an auricle image is acquired at the screen side of the mobile terminal when there is an incoming call for the mobile terminal;

Block 102: if the auricle image is acquired, then comparing the auricle image with image templates in a pre-stored auricle standard library to determine whether there is a matching image template;

Block 103: if it is determined that there is a matching image template, then controlling the mobile terminal to answer the incoming call.

The mobile terminal may be selected from but is not limited to a mobile phone, a tablet computer, a palmtop or the like device that can be conveniently carried about.

It has been proved by the present inventor through a large number of scientific experiments that the auricles (or ears) have the uniqueness, and even for the twins, the auricles thereof are just similar but not identical to each other. And as time goes on, the auricle is not prone to deformation due to influences of the age and facial expressions or the like. Accordingly, the auricle can be used as a biological feature to identify users just like the fingerprint and the pupil, and nowadays mobile terminals are all equipped with an image capturing device such as a camera, so it is easy to capture the auricle image.

Figure 2:
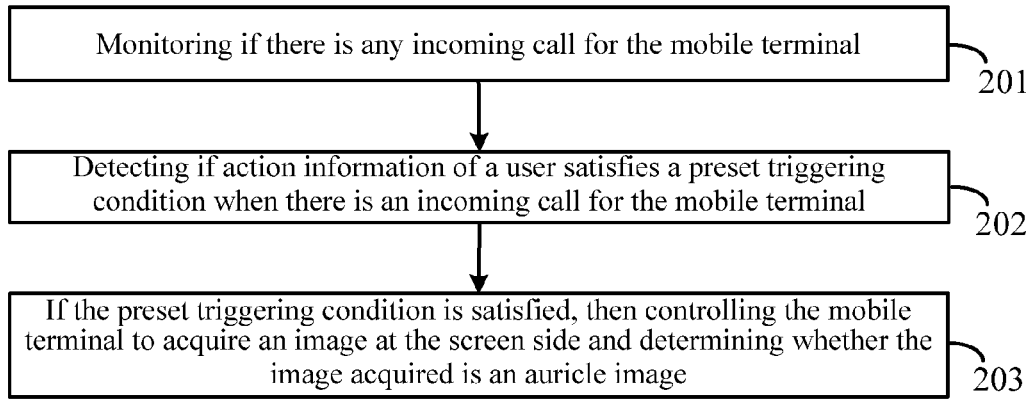
FIG. 2 is a schematic flowchart of a process of detecting whether an auricle image is acquired at the screen side of the mobile terminal in FIG. 1.

Referring to FIG. 2, there is shown a schematic flowchart of detecting if an auricle image is acquired at the screen side of the mobile terminal when there is an incoming call for the mobile terminal in FIG. 1. As shown in FIG. 2 and in combination with FIG. 1, the block 101 may comprises:

Block 201: monitoring if there is any incoming call for the mobile terminal;

Block 202: detecting if action information of a user satisfies a preset triggering condition when there is an incoming call for the mobile terminal;

Block 203: if the preset triggering condition is satisfied, then controlling the mobile terminal to acquire an image at the screen side and determining whether the image acquired is an auricle image.

In one embodiment, the preset triggering condition in the block 202 may be optionally an object that is approaching. In a specific embodiment for example, if an incoming call for the mobile terminal is monitored, a capacitive touch screen or a distance sensor may be further used to detect if there is any object approaching in block 202; and if there is an object approaching, the capacitive touch screen or a camera is used to acquire an image of the object at the screen side and determine whether the image of the object is an auricle image in the block 203.

In one embodiment, the capacitive touch screen of the mobile terminal can achieve determination of whether there is any body approaching according to the electrical signal of the human body so as to determine the images of different body parts such as the face, the auricle or other parts.

Further, the preset triggering condition in the block 202 may be optionally to press or touch a button or icon for activating the auricle identification by the user, and optionally, the specific action information of the user may be, for example, pressing the capacitive touch screen continuously, performing a specific gesture action, labeling a special pattern on the capacitive touch screen, or language information from user, but it is not limited thereto.

The method further comprises the following blocks before the block 102 or the block 101: acquiring image templates and storing the image templates to the auricle standard library.

It can be understood that, the auricle image of the user may be acquired by using the capacitive touch screen or the camera of the mobile terminal, or the auricle image may be subjected to feature extraction for use as the image template and may be stored into the auricle standard library. In the present disclosure, the auricle image may be a colored or monochromatic image obtained by using the camera to take a photo of the auricle and may also be a capacitance distribution map obtained by using the capacitive touch screen to detect the capacitance of the auricle.

Referring further to Table 1, Table 1 is a table illustrating associations between image templates and users in the auricle standard library. As shown in Table 1, the auricles of different users may be associated with the different users and may be stored into the auricle standard library.

TABLE 1 a table illustrating associations between image templates and users in the auricle standard library

| Menu | Description |
| --- | --- |
| The first user | For storing an auricle image template of the first user |
| The second user | For storing an auricle image template of the second user |
| The third user | For storing an auricle image template of the third user |
| Other users | For storing an auricle image template of other users |

Optionally, a super-user may be further provided in this method, who may perform operations such as making additions, editions, amendments, deletions on the image templates or associated users in the auricle standard library through authentication.

Referring to Table 2, Table 2 is an exemplary table illustrating authentication of the super-user. As shown in Table 2, the super-user may choose to use the password authentication mode or other biological authentication modes.

TABLE 2 an exemplary table illustrating authentication of the super-user

| Verification mode | illustration |
| --- | --- |
| Password authentication mode | For acquiring the password of the super-user or other preset passwords for verification |
| Other biological feature authentication modes | For acquiring a feature like a fingerprint, a face, a voice, or a pupil of the super-user for verification |

It can be understood that, if the super-user is authenticated by using a password or other biological features, then when the password acquired matches the password of the super-user or some other preset password or when the biological feature acquired matches the fingerprint, face, voice, or pupil of the super-user, it is considered that the super-user passes the verification. Then the mobile terminal determines that the current user is the super-user who can perform operations such as making additions, editions, amendments, deletion on the image templates or associated users thereof.

Optionally, when the mobile terminal activates the automatic answering function for the first time, i.e., when the block 101 or the block 203 is executed for the first time, this method provides operations of setting the number of automatically answered users, setting the auricle image templates and setting the authentication modes of the super-user. It can be understood that, the super-user will perform operations such as amendment through authentication later.

Optionally, the method may further comprise following blocks after the block 103:

Block 104: if it is determined that there is no matching image template, then displaying a prompt message of whether adopting other verification modes for answering;

Block 105: if what is acquired is an instruction, then further acquiring other verification modes and determining whether they satisfy a preset verification condition; and Block 106: if the preset verification condition is satisfied, then controlling the mobile terminal to answer the incoming call.

If it is determined that there is no matching image template in the block 104, usually the mobile terminal is taken up and hold near the auricle and, therefore, the text prompt message may not be noticed in time. In this case, a sound or vibration may be used to prompt the user. That is, the block 104 may comprise: if it is determined that there is no matching image template, a message of whether adopting other verification modes to answer the incoming call will be displayed after prompting the user through a sound or vibration.

In the block 105, said other verification modes may optionally be password verification or other biological feature verification modes, which are same as the authentication modes of the super-user in Table 2. That is, optionally, the password is acquired and it is determined whether the password matches (or is the same as) the password of the pre-user or other preset password, or a feature such as a fingerprint, a face, a voice, or a pupil is acquired and it is determined whether the feature matches (or is the same as) the biological feature of the super-user. If it is determined that there is a matching password or feature, then the mobile terminal is controlled to answer the incoming call in the block 106.

Figure 3:
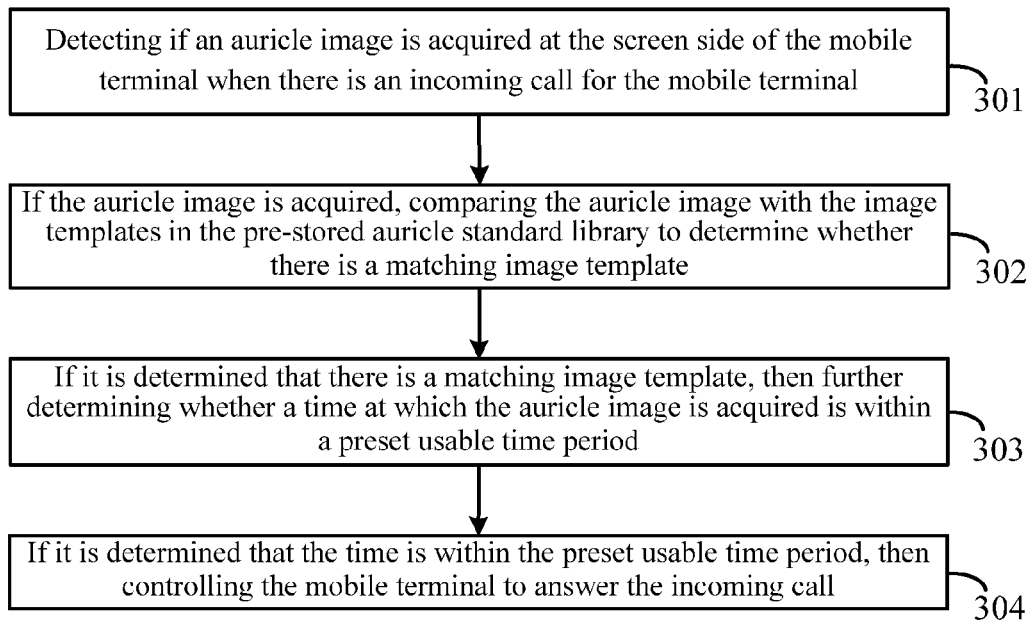
FIG. 3 is a schematic flowchart of a second embodiment of the method for automatically answering an incoming call according to the present disclosure.

Referring to FIG. 3, FIG. 3 is a schematic flowchart of a second embodiment of the method for automatically answering an incoming call according to the present disclosure. As shown in FIG. 3, the method may comprise:

Block 301: detecting if an auricle image is acquired at the screen side of the mobile terminal when there is an incoming call for the mobile terminal;

Block 302: if the auricle image is acquired, comparing the auricle image with the image templates in a pre-stored auricle standard library to determine whether there is a matching image template;

Block 303: if it is determined that there is a matching image template, then further determining whether a time at which the auricle image is acquired is within a preset usable time period; and Block 304: if it is determined that the time at which the auricle image is acquired is within the preset usable time period, then controlling the mobile terminal to answer the incoming call.

In one embodiment, the block 301 and block 302 are the same as the block 101 and block 102 in the aforesaid first embodiment, so they will not be further described herein.

In one embodiment, the usable time period is associated with the image templates and preset in the auricle standard library or the module storing the auricle standard library.

The super-user according to the aforesaid first embodiment may further set the image template and the corresponding usable time period for different users through authentication so as to manage the time of answering the call for the different users.

Further, the super-user may sort a plurality of users into groups and set the usable time period of automatically answering an incoming call for each of the different groups. Referring to Table 3, Table 3 is an exemplary table illustrating associations between groups and usable time periods in the auricle standard library.

TABLE 3 an exemplary table illustrating associations between groups and usable time periods in the auricle standard library

| Group Name | Usable Time Period |
| --- | --- |
| Personal | Monday to Friday 09:00-18:00 |
| Family Member | Monday to Friday 09:00-18:00, Monday to Friday 01:00-07:59 Saturday to Sunday 00:00-24:00 |
| Friends | Saturday to Sunday 00:00-24:00 |
| Other Groups | A time period set by the super-user |

As shown in Table 3, the super-user may set a different usable time period for each user according to the habit or the status of work and study of the user so as to manage the using time of the user and the mobile terminal. The user included in the group named "Personal" in Table 3 is able to automatically answer an incoming call through auricle identification at work hours; others such as a user in the "Family Member" group can only automatically answer an incoming call through auricle identification after work; and the user in the "Friends" group can only automatically answer an incoming call through auricle identification at weekends.

It can be understood that, operations such as making additions, editions, amendments and deletions on information such as a user member in a group and the corresponding usable time period thereof can be performed by the super-user through the authentication mode shown in Table 2.

Figure 4:
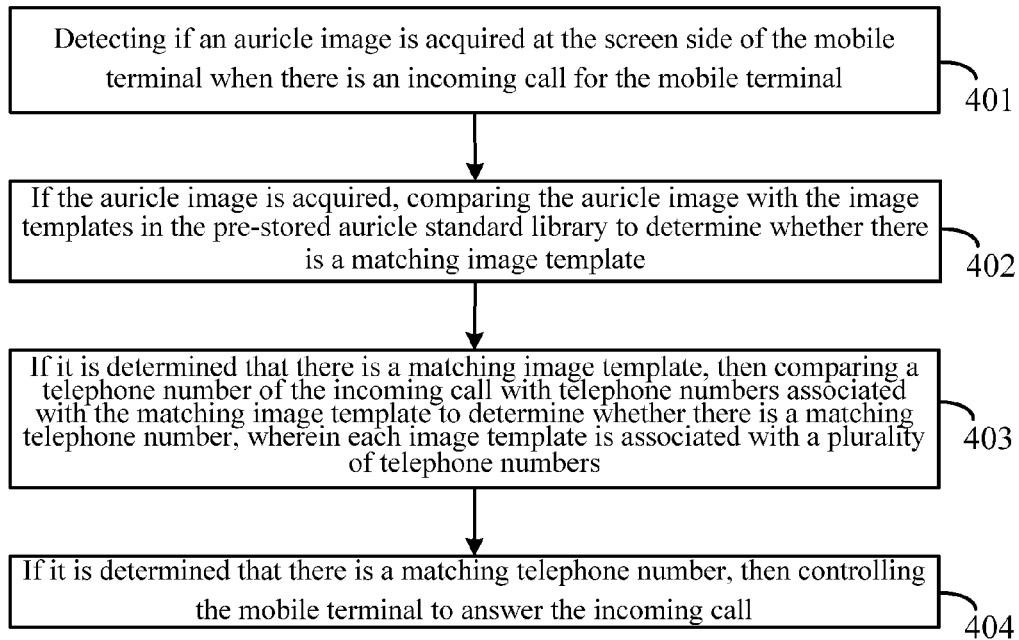
FIG. 4 is a schematic flowchart of a third embodiment of the method for automatically answering an incoming call according to the present disclosure.

Referring to FIG. 4, there is shown a schematic flowchart of a third embodiment of the method for automatically answering an incoming call according to the present disclosure. As shown in FIG. 4, the method may comprise:

Block 401: detecting if an auricle image is acquired at the screen side of the mobile terminal when there is an incoming call for the mobile terminal;

Block 402: if the auricle image is acquired, comparing the auricle image with image templates in the pre-stored auricle standard library to determine whether there is a matching image template;

wherein, each of the image templates is associated with a plurality of telephone numbers;

Block 403: if it is determined that there is a matching image template, then comparing a telephone number of the incoming call with the plurality of telephone numbers associated with the matching image template to determine whether there is a matching telephone number;

Block 404: if it is determined that there is a matching telephone number, then controlling the mobile terminal to answer the incoming call.

The block 401 and block 402 are the same as the block 101 and block 102 in the aforesaid first embodiment and the block 301 and block 302 in the aforesaid second embodiment, so they will not be further described herein.

Each image template and the plurality of telephone numbers associated with it are preset in the auricle standard library or the module storing the auricle standard library.

The super-user in the aforesaid first and second embodiments may further set the image template and the plurality of corresponding telephone numbers through the authentication mode shown in Table 2 to manage the callers of incoming calls for different users. Further, the super-user may also set the corresponding image template of each user to associate with one telephone number, that is, each image template is associated with at least one telephone number.

Referring to Table 4, Table 4 is an exemplary table illustrating the image templates and associated telephone numbers thereof in the auricle standard library

TABLE 4 an exemplary table illustrating the image templates and associated
telephone numbers thereof in the auricle standard library

| Image Template | Associated Telephone Number |
| --- | --- |
| Image template of the first user | Telephone number 1 |
| Image template of the second user | Telephone number 1, Telephone number 2, Telephone number 3 |
| Image template of the third user | Telephone number 2, Telephone number 3 |
| Image template of other users | Telephone numbers set by the super-user |

As shown in Table 4, the super-user may set different telephone numbers of incoming calls that can be answered according to the habit or social network of each user so as to manage callers of the incoming calls of each user.

It can be understood that, operations such as making additions, editions, amendments and deletions can be performed on the telephone number information corresponding to each image module through the authentication mode shown in the aforesaid table 2.

Figure 5:
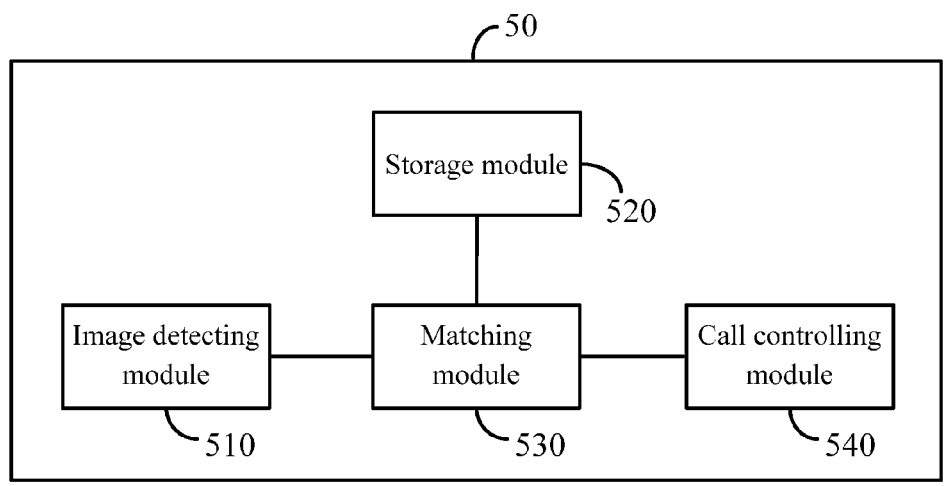
FIG. 5 is a schematic structural view of an embodiment of a mobile terminal according to the present disclosure.

Referring to FIG. 5, there is shown a schematic structural view of a first embodiment of a mobile terminal according to the present disclosure. As shown in FIG. 5, the mobile terminal 50 may comprise:

an image detecting module 510, being configured to detect if an auricle image is acquired at the screen side of the mobile terminal 50 when there is an incoming call for the mobile terminal 50;

an storage module 520, being configured to pre-store an auricle standard library comprising auricle templates;

a matching module 530, being configured to, if the auricle image is acquired, compare the auricle image with the image templates in the storage module 520 to determine whether there is a matching image template; and a call controlling module 540, being configured to, if it is determined that there is a matching image template, then control the mobile terminal 50 to answer the incoming call.

The image detecting module 510, the storage module 520, the matching module 530 and the call controlling module 540 in this embodiment execute the block 101, the block 102 and the block 103 in the first embodiment of the method for automatically answering an incoming call correspondingly, so they will not be further described herein.

In one embodiment, the mobile terminal may be selected from, but is not limited to, a mobile phone, a tablet computer, a palmtop or the like device that can be conveniently carried about.

Figure 6:
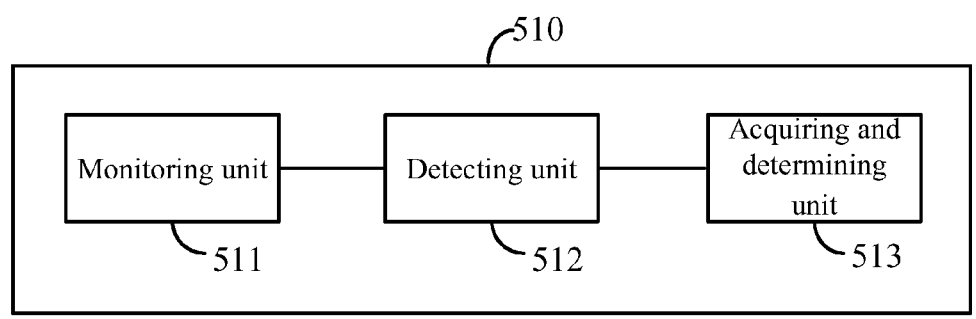
FIG. 6 is a schematic structural view of an image detecting module in FIG. 5.

FIG. 6 is a schematic structural view of an image detecting module. As shown in FIG. 6, the image detecting module 510 further may comprise a monitoring unit 511, a detecting unit 512 and an acquiring and determining unit 513.

The monitoring unit 511 may be configured to monitor if there is any incoming call for the mobile terminal 50.

The detecting unit 512 may be configured to detect if action information of a user satisfies a preset triggering condition when there is an incoming call for the mobile terminal 50.

The acquiring and determining unit 513 may be configured to, if the preset triggering condition is satisfied, control the mobile terminal 50 to acquire an image at the screen side and determine whether the image acquired is an auricle image.

The monitoring unit 511, the detecting unit 512 and the acquiring and determining unit 513 may execute the block 201, the block 202 and the block 203 in the first embodiment of the method for automatically answering an incoming call correspondingly, so they will not be further described herein.

Optionally, the detecting unit 512 may be further configured to, when an incoming call for the mobile terminal 50 is monitored, use the capacitive touch screen or the distance sensor of the mobile terminal 50 to detect if there is any object approaching.

The acquiring and determining unit 513 may be further configured to, when there is an object approaching, use the capacitive touch screen or the camera on the mobile terminal 50 to acquire an image of the object at the screen side and determine whether the image of the object is an auricle image.

In other embodiments, the preset triggering condition may be not limited to there being an object approaching as described above, but may further be to press or touch a button or icon for activating the auricle identification by the user, and optionally, the specific action information of the user is, for example, pressing the capacitive touch screen continuously, performing a specific gesture action, labeling a special pattern on the capacitive touch screen, or language information from user, but it is not limited thereto.

In another embodiment of the mobile terminal according to the present disclosure, the storage module 520 further pre-stores usable time periods associated with the image templates herein. If it is determined that there is a matching image template, then the matching module 530 is further configured to determine whether a time at which the auricle image is acquired is within a preset usable time period, and if it is determined that the time at which the auricle image is acquired is within the preset usable time period, then the call controlling module 540 controls the mobile terminal 50 to answer the incoming call. It can be understood that, the usable time period is associated with the image templates and is pre-stored in the auricle standard library, or the usable time period is associated with the image templates but is pre-stored in the storage module 520. In the present embodiment, the matching module 530 and the call controlling module 540 may execute the block 303 and block 304 in the second embodiment of the method for automatically answering an incoming call correspondingly, so they will not be further described herein.

Optionally, the call controlling module 540 may be figured to, when it is determined that there is a matching image template, further determine whether a time at which the auricle image is acquired is within a preset usable time period, and if it is determined that the time at which the auricle image is acquired is within the preset usable time period, then control the mobile terminal 50 to answer the incoming call.

In another embodiment of the mobile terminal according to the present disclosure, each of the image templates preset in the storage module 520 may be associated with a plurality of telephone numbers. The matching module 530 may be further configured to compare a telephone number of the incoming call with the plurality of telephone numbers associated with the matching image template to determine whether there is a matching telephone number, and if it is determined that there is a matching telephone number, then the call controlling module 540 controls the mobile terminal 50 to answer the incoming call. It can be understood that, the plurality of telephone numbers may be associated with the image template and may be pre-stored in the auricle standard library, or the plurality of telephone numbers may be associated with the image template but may be pre-stored in the storage module 520. In the present embodiment, the matching module 530 and the call controlling module 540 may execute the block 403 and block 404 in the third embodiment of the method for automatically answering an incoming call correspondingly, so they will not be further described herein.

Optionally, the call controlling module 540 may be configured to, if it is determined that there is a matching image template, further compare a telephone number of the incoming call with the plurality of telephone numbers associated with the matching image template to determine whether there is a matching telephone number, and if it is determined that there is a matching telephone number, then control the mobile terminal 50 to answer the incoming call.

Further, the mobile terminal 50 may further comprise a prompting module and other verification modules.

The prompting module may be configured to, if it is determined that there is no matching image template, then display a prompt message of whether adopting other verification modes to answer the incoming call.

The other verification modules are configured to, when an instruction of adopting other verification modes is acquired, then acquire the other verification modes and determine whether they satisfy a preset verification condition.

The call controlling module 540 may be further configured to, if the preset verification condition is satisfied, control the mobile terminal 50 to answer the incoming call.

If it is determined that there is no matching image template, usually the mobile terminal 50 is taken up and hold near the auricle and, therefore, the text prompt message may not be noticed in time. In this case, a sound or vibration may be used to prompt the user. That is, the prompting module may be further configured to: if it is determined that there is no matching image template, then display a message of whether adopting other verification modes to answer the incoming call after prompting the user through a sound or vibration.

Said other verification modes in the prompt module and the other verification modules may optionally be password verification or other biological feature verification modes, which are same as the authentication modes of the superuser in Table 2 and will not be further described herein.

The present disclosure also discloses a mobile terminal, which comprises a processor, a storage, a bus, a capacitive touch screen or a distance sensor, a camera and a screen. The processor, the storage, the capacitive touch screen or the distance sensor, the camera and the screen are connected to the bus respectively, the storage is configured to store a program, and the processor is configured to execute the program. The program may be configured to:

monitor if there is any incoming call for the mobile terminal;

detect if action information of a user satisfies a preset triggering condition when an incoming call for the mobile terminal is monitored;

if the preset triggering condition is satisfied, then control the mobile terminal to acquire an image at the screen side and determine whether the image acquired is an auricle image;

if the image is an auricle image, then compare the auricle image with image templates in an pre-stored auricle standard library to determine whether there is a matching image template;

if it is determined that there is a matching image template, then further determine whether a time at which the auricle image is acquired is within a preset usable time period; and if it is determined that the time at which the auricle image is acquired is within the preset usable time period, then control the mobile terminal to answer the incoming call.

The program presets that each of the image templates is associated with a plurality of telephone numbers, and the program is further configured to compare a telephone number of the incoming call with the plurality of telephone numbers associated with the matching image template, determine whether there is a matching telephone number, and if it is determined that there is a matching telephone number, then control the mobile terminal to answer the incoming call.

The program may be further configured to, when an incoming call for the mobile terminal is monitored, control the capacitive touch screen or the distance sensor of the mobile terminal to detect if there is any object approaching; and when there is an object approaching, control the capacitive touch screen or the camera to acquire an image of the object at the screen side and determine whether the image of the object is an auricle image.

In the embodiments of the present disclosure, the various function units may be integrated into one processor, or each unit may be implemented as a separate physical unit, or two or more units may be integrated into a single unit. The integrated unit may be implemented either in the form of hardware or in the form of software function units.

If the integrated unit is to be implemented in the form of software function units and to be marketed or used as a standalone product, then it can be stored in a computer-readable storage medium. Based on this understanding, the technical solutions of the present disclosure in nature or the part of the technical solutions that makes improvements over the prior art or all or part of the technical solutions can be embodied as a software product. The computer software product is stored in a storage medium, and comprises a plurality of instructions which enable a computer device (e.g., a personal computer, a server, a network device or etc.) or a processor to execute all or some of the blocks of the method described in the various embodiments of the present disclosure. The aforesaid storage medium includes various media that can store program codes such as a USB flash disk, a mobile hard disk, a read-only memory (ROM), a random access memory (RAM), a magnetic disk or an optical disk.

As compared with the prior art, in the present disclosure, firstly when there is an incoming call for the mobile terminal, whether an auricle image is acquired by the mobile terminal is detected, and if the auricle image is acquired, then the auricle image is compared with image templates in a pre-stored auricle standard library to determine whether there is a matching image template, and if it is determined that there is a matching image template, then it is further determined whether a time at which the auricle image is acquired is within a preset usable time period or a telephone number of the incoming call is compared with the plurality of telephone numbers associated with the matching image template to determine whether there is the matching telephone number, and only when the time is within the preset usable time period or there is a matching telephone number, will the mobile terminal be controlled to answer the incoming call. As compared with the existing technology of manually operating the mobile terminal by using a single hand or both hands to press a button or slide the screen, the mobile terminal of the present disclosure compares the auricle image acquired with preset image templates, and if there is a matching image template, then the incoming call can be automatically answered. Thereby, the incoming call can be answered simply and conveniently without the need of manual operation. Optionally, only when it is determined that the time at which the auricle image is acquired is within the preset usable time period or when there is a telephone number associated with the matching image template, will the mobile terminal be controlled to answer the incoming call. This allows for management of the answering time or callers of incoming calls for different users, and has the feature of differential call time management and caller limitation, thus improving the user experiences.

Preferred embodiments of the present disclosure have been described above with reference to the attached drawings, but this is not intended to limit the scope of the present disclosure. Any modifications, equivalent replacements and alterations that are made by those skilled in the art without departing from the scope and spirits of the present disclosure shall all be covered within the scope of the present disclosure.

What is described above is merely embodiments of the present disclosure, thus shouldn't be construed to be limiting the patent scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A mobile terminal, comprising a processor, a storage, a bus and a screen, wherein the processor, the storage and the screen are connected to the bus respectively, the storage is configured to store a program, and the processor is configured to execute the program;
the program is configured to:
monitor an incoming call for the mobile terminal;
detect whether action information of a user satisfies a preset triggering condition when the incoming call for the mobile terminal is monitored;
when the preset triggering condition is satisfied, control the mobile terminal to acquire an image at a screen side of the mobile terminal;
when the image acquired is an auricle image, compare the auricle image with image templates stored in a pre-stored auricle standard library;
when the auricle image matches a matching image template of the image templates, determine whether a time at which the auricle image is acquired is within a preset usable time period; and
when the time at which the auricle image is acquired is within the preset usable time period, control the mobile terminal to answer the incoming call.

2. The mobile terminal of claim 1, wherein each of the image templates is associated with at least one telephone number, and the program is further configured to compare a telephone number of the incoming call with the at least one telephone number associated with the matching image template, and when the telephone number of the incoming call matches the at least one telephone number, control the mobile terminal to answer the incoming call.

3. The mobile terminal of claim 1, wherein the mobile terminal further comprises a capacitive touch screen or a distance sensor, and a camera;
the program is further configured to, when the incoming call for the mobile terminal is monitored, control the capacitive touch screen or the distance sensor of the mobile terminal to detect whether an object is approaching; and
the program is further configured, when the object is approaching, to control the capacitive touch screen or the camera to acquire an image of the object at the screen side and determine whether the image of the object is the auricle image.

4. The mobile terminal of claim 3, wherein the auricle image is a colored or monochromatic image obtained by using the camera to take a photo of the auricle.

5. The mobile terminal of claim 3, wherein the auricle image is a capacitance distribution map obtained by using the capacitive touch screen to detect the capacitance of the auricle.

6. The mobile terminal of claim 1, wherein the preset triggering condition comprises the user presses or touches a button or icon for an auricle identification, and specific action information of the user.

7. The mobile terminal of claim 6, wherein the specific action information of the user comprises pressing the capacitive touch screen continuously, performing a specific gesture action, labeling a special pattern of the capacitive touch screen, or language information from the user.

8. A method for a mobile terminal to automatically answer an incoming call, wherein the method comprises:
detecting whether the auricle image is acquired at a screen side of the mobile terminal when an incoming call for the mobile terminal is received;
when the auricle image is acquired, comparing the auricle image with image templates in a pre-stored auricle standard library to determine whether the auricle image matches a matching image template of the image templates;
when the auricle image matches the matching image template, controlling the mobile terminal to answer the incoming call.

9. The method of claim 8, wherein controlling the mobile terminal to answer the incoming call comprises:
determining whether a time at which the auricle image is acquired is within a preset usable time period to answer the incoming call; and
when the time at which the auricle image is acquired is within the preset usable time period, controlling the mobile terminal to answer the incoming call.

10. The method of claim 8, wherein each of the image templates is associated with at least one telephone number, and controlling the mobile terminal to answer the incoming call comprises:
comparing a telephone number of the incoming call with the at least one telephone number associated with the matching image template; and
when the telephone number of the incoming call matches a matching telephone number of the at least one telephone number associated with the matching image template, controlling the mobile terminal to answer the incoming call.

11. The method of claim 8, wherein detecting whether the auricle image is acquired at the screen side of the mobile terminal when the incoming call for the mobile terminal is received comprises:
monitoring whether the incoming call for the mobile terminal is received;
detecting whether action information of a user satisfies a preset triggering condition when the incoming call for the mobile terminal is received;
when the preset triggering condition is satisfied, controlling the mobile terminal to acquire an image at the screen side and determining whether the image acquired is the auricle image.

12. The method of claim 11, wherein detecting whether action information of the user satisfies the preset triggering condition when the incoming call for the mobile terminal is received comprises:

using a capacitive touch screen or a distance sensor of the mobile terminal to detect whether an object is approaching; and when the preset triggering condition is satisfied, controlling the mobile terminal to acquire the image at the screen side, and determining whether the image acquired is the auricle image comprises:

when the object is approaching, using the capacitive touch screen or a camera to acquire an image of the object at the screen side and determining whether the image of the object is the auricle image.

13. The method of claim 12, further comprising performing operations comprising making additions, editions, amendments, deletions on the image templates or associated users in the pre-stored auricle standard library.

14. A mobile terminal, comprising a non-transitory program storage medium and a processor, the non-transitory program storage medium comprising:

an image detecting module configured to detect whether an auricle image is acquired at a screen side of the mobile terminal when an incoming call for the mobile terminal is received;

a storage module configured to pre-store an auricle standard library comprising auricle templates;

a matching module configured to, when the auricle image is acquired, compare the auricle image with the image templates in the storage module to determine whether the auricle image matches a matching image template of the image templates; and a call controlling module configured to, when the auricle image matches the matching image template, control the mobile terminal to answer the incoming call.

15. The mobile terminal of claim 14, wherein when the auricle image matches the matching image template, the matching module is further configured to determine whether a time at which the auricle image is acquired is within a preset usable time period to answer the incoming call, and when it is determined that the time at which the auricle image is acquired is within the preset usable time period, the call controlling module controls the mobile terminal to answer the incoming call; and wherein the usable time period is associated with the image templates and preset in the storage module.

16. The mobile terminal of claim 14, wherein each of the image templates preset in the storage module is associated with at least one telephone number, and the matching module is further configured to compare a telephone number of the incoming call with the at least one telephone number associated with the matching image template, and when the telephone number of the incoming call matches a matching telephone number of the at least one telephone number associated with the matching image template, then the call controlling module controls the mobile terminal to answer the incoming call.

17. The mobile terminal of claim 14, wherein the image detecting module further comprises a monitoring unit, a detecting unit, and an acquiring and determining unit;

the monitoring unit is configured to monitor the incoming call for the mobile terminal;

the detecting unit is configured to detect whether action information of a user satisfies a preset triggering condition when the incoming call for the mobile terminal is received; and the acquiring and determining unit is configured to, when the preset triggering condition is satisfied, to control the mobile terminal to acquire an image at the screen side and determine whether the image acquired is the auricle image.

18. The mobile terminal of claim 17, wherein the detecting unit is further configured to, when an incoming call for the mobile terminal is monitored, use a capacitive touch screen or a distance sensor of the mobile terminal to detect whether the object is approaching; and the acquiring and determining unit is further configured to, when an object is approaching, use the capacitive touch screen or a camera to acquire the image of the object at the screen side and determine whether the image of the object is the auricle image.

19. The mobile terminal of claim 18, wherein the auricle image is a colored or monochromatic image obtained by using the camera to take a photo of the auricle.

20. The mobile terminal of claim 18, wherein the auricle image is a capacitance distribution map obtained by using the capacitive touch screen to detect a capacitance of the auricle.

* * * * *